July 26, 1938.  H. V. ATWELL  2,125,234
METHOD OF TREATING HYDROCARBON OIL
Original Filed April 22, 1933
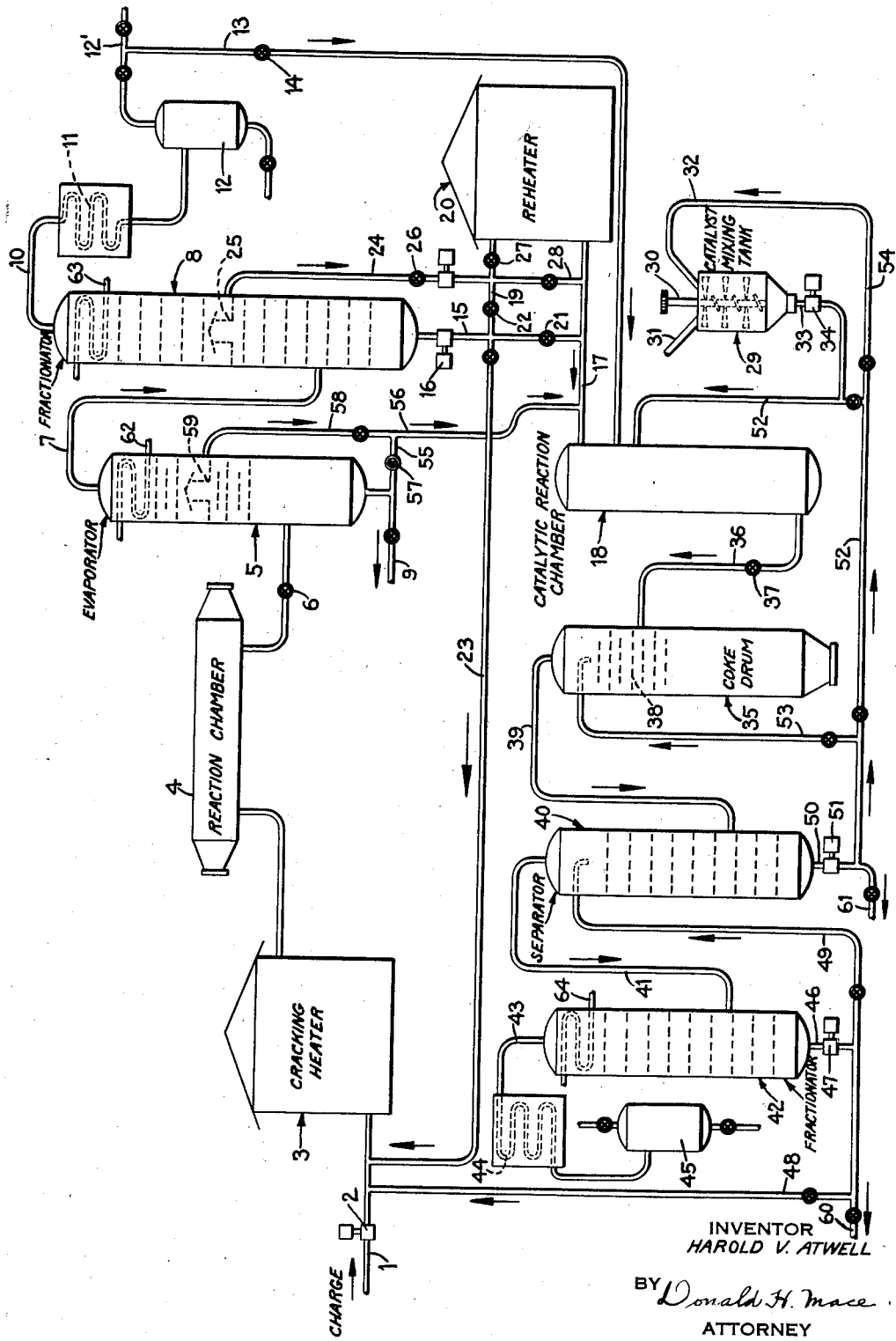
INVENTOR
HAROLD V. ATWELL
BY Donald H. Mace
ATTORNEY Patented July 26, 1938

2,125,234

UNITED STATES PATENT OFFICE 2,125,234

METHOD OF TREATING HYDROCARBON OIL

Harold V. Atwell, White Plains, N. Y., assignor to Gasoline Products Company, Inc., Newark, N. J., a corporation of Delaware Application April 22, 1933, Serial No. 667,382
Renewed October 28, 1936

5 Claims. (Cl. 196—54)

This invention relates to processes for the treatment of hydrocarbon oil, particularly for the production of gasoline. In the pyrolytic cracking of relatively heavy hydrocarbon oils for the production of lighter hydrocarbon products such as those in the gasoline boiling range, losses are encountered which result from the formation of incondensable gases and vaporous products having a lower boiling point than that desired for the final product, during the cracking operation. Furthermore relatively refractory products, somewhat heavier than the desired product, and known as cycle stocks, are produced. These gases and/or vapors, which may form a considerable percentage of the original charging stock, are usually considered to be a loss as far as the production of gasoline or other lighter products is concerned, being diverted from the process, or burned to produce the necessary heat for the conversion of the charging stock. It is an object of my invention to provide an improved process whereby normally incondensable gases and/or vapors resulting from a cracking operation, or derived from other sources, are combined with liquid hydrocarbons to form desired liquid products. A further object is to convert relatively refractory cycle stock into less refractory stock more suitable for further cracking.

More particularly it is an object of my invention to react normally incondensable hydrocarbon gases with normally liquid hydrocarbon products in the presence of a catalyst such as aluminum chloride, and to crack pyrolytically the products resulting from such reaction, to produce a final desired product.

In accordance with my invention a charging stock of any conventional nature is subjected to a pyrolytic cracking process with the attendant production of fixed or normally incondensable gases, and cycle stock or condensate heavier than the final desired product. The incondensable gases and the cycle stock or other heavier oil are brought into contact with one another in the presence of aluminum chloride, zinc chloride, ferric chloride, boron tri-fluoride or other metallic halide catalyst, at a reaction temperature, in order to bring about polymerization of the gases and reaction thereof with the liquid products, to produce other liquid products suitable for further cracking. Subsequently to the reaction of the gases and liquids in the presence of the catalyst, the products are separated into a plurality of fractions, at least one of which is suitable for further cracking by the application of heat, to produce a final desired product, such as gasoline distillate. The gases used may be derived from a conventional cracking process or other source while the liquid with which they are reacted is preferably a cycle stock from that cracking process, since such cycle stocks have a large proportion of naphthenic compounds, with which olefinic gases, such as those derived from the cracking process, react readily in the presence of aluminum chloride. This process is particularly applicable in connection with vapor phase cracking or reforming operations, wherein it is desired to produce high anti-knock gasoline, and wherein the attendant gas losses due to the drastic cracking operations are usually high.

The process also presents particular advantages in connection with the conversion of relatively refractory stocks such as cycle stocks, more particularly relatively light cycle stocks, such as heavy naphtha, or kerosene, which are normally relatively hard to crack but which by this process can be converted or polymerized, either with or without interaction with incondensable gases or light vapors, to heavier and less refractory stocks, suitable for further cracking for the production of gasoline of the desired characteristics.

The above mentioned and further objects and advantages of my invention and the manner of attaining them, will be more fully explained in the following description, taken in conjunction with the accompanying drawing.

The figure of the drawing represents diagrammatically an oil cracking system embodying my invention.

Referring more particularly to the drawing, reference numeral 1 indicates a charging line through which charging stock, such as gas oil, kerosene or heavy naphtha, is forced by a pump 2 into the coils of the furnace or heater 3. After passing through the heater the oil emerges at a temperature in the cracking range and is introduced into a reaction chamber 4, wherein further conversion takes place, the resulting products being transferred to an evaporator 5, maintained at a reduced pressure, by virtue of reducing valve 6, wherein separation of vapors from liquids takes place. The temperature and pressure utilized in the furnace coils and reaction chamber will be dependent upon the type of stock charged to the system, being in the case of gas oil, for example, in the neighborhood of 850° to 900° F. and about 750 pounds per square inch. When naphtha is being subjected to reforming operations the temperature would be higher, for example in the neighborhood of 900° to 1,000° F., preferably in the neighborhood of 975° F., while the pressure might be lower, for example, 200 to 500 pounds per square inch, preferably about 450 pounds per square inch.

The products in the separator 5 separate into vapors which pass off through vapor line 7, into fractionator 8, and a heavier residue which may be withdrawn from the process through valved drawoff line 9. In the fractionator 8 the products separate, in the well known manner, into relatively light vapors of the desired boiling range for the desired product or for a by-product, and reflux condensate. The vapors pass off from the top of the fractionator through vapor line 10 and condenser 11, into gas separator 12. In the gas separator gases are removed from the distillate in the usual manner and drawn off from the top of the separator through pipe 13 having valve 14.

From the bottom of the fractionator reflux condensate is withdrawn through pipe 15 and is forced by pump 16, either directly into pipe 17 leading to catalytic chamber 18 or through pipe 19 and reheater 20 into the pipe 17. The flow of oil may be controlled as desired by manipulation of valves 21 and 22, all or part of the condensate being sent through either path as desired. The temperature of the condensate withdrawn from the bottom of the fractionator may, in ordinary circumstances, be sufficient to maintain the desired temperature in the catalytic reaction chamber. In certain cases with relatively refractory stocks, or in those cases when it is desired to obtain a relatively rapid conversion rate in the reaction chamber, added heat may be imparted to the condensate, by the passage thereof through the reheater 20. It is not the object to heat the oil to a pyrolytic cracking temperature in the reheater, but merely to raise this temperature to such a value that effective catalytic cracking may be obtained in the reaction chamber 18. In some cases this added temperature for the reflux condensate might be secured by heat exchange of the condensate with hot products in other parts of the system. A return line 23 is provided whereby all or part of the reflux condensate from the bottom of fractionator 8 may be recycled to the heater 3 for the further pyrolytic treatment if desired. In case that the condensate is so recycled a lighter and more refractory condensate may be removed from an intermediate point of fractionator 8 through pipe line 24, connected to trap-out tray 25, for treatment in the reaction chamber 18. This side stream may either pass through the reheater 20 before entering the catalytic reaction chamber, or it may travel directly to the chamber without further addition of heat. Valves 26 and 27 in conjunction with valved bypass line 28 furnish the necessary control.

Gas from seperator 12 or from an external source 12', passes through line 13 into reaction chamber 18, and a quantity of catalyst is also introduced into that chamber. While the catalyst may be introduced in any well known manner, either in dry or wet form, I prefer to make a slurry of the catalyst, and oil, for ease of handling. Reference numeral 29 indicates a catalyst mixing tank which may be provided with an agitator 30. Catalyst in dry powdered form is introduced into this tank through pipe 31 and oil is introduced through pipe 32. The oil and catalyst mixture in the chamber is thoroughly agitated to insure good mixture thereof and the resulting slurry is removed from the mixing tank through pipe line 33 and forced by pump 34 into the catalytic reaction chamber 18, preferably at a point adjacent to that of the introduction of the oil to be converted.

In the reaction chamber, which is maintained at a catalytic cracking temperature of, for example 600° to 700° F., catalytic conversion of the condensate and gas takes place, lighter and heavier products being formed. The size of the catalytic chamber is sufficient to insure an adequate time of contact for the conversion to take place, the products passing through the chamber and being transferred therefrom to coke drum 35 through conduit 36. The reaction chamber may be maintained at a pressure which may vary considerably but which is preferably about 100 pounds per square inch. The coke drum on the other hand is more suitably held under a lower pressure, for example 10 to 20 pounds per square inch, the necessary pressure reduction being effected by reducing valve 37 in the line 36. In the coke drum the entering oil flows downwardly over a series of baffle plates 38, into the lower part of the drum, vapors and liquids undergoing separation at the same time. The vapors move upwardly, past the baffle plates, and those remaining uncondensed in the coke drum travel through vapor line 39 into separator 40, wherein the vapors are separated into a relatively light vaporous fraction and a heavier condensate, the temperature of the top of the separator being preferably about 400° F. In the coke drum a certain amount of coke or carbonaceous material is deposited, this containing an appreciable percentage of the catalytic material. This carbonaceous material may be removed from time to time and any free catalyst removed for further use. Additional catalytic material is separated out with the condensate in the separator 40, because of the relatively low temperature maintained at the top of the separator, with the result that the vapors remaining uncondensed at the top of the separator are relatively free from catalytic material. These vapors flow through vapor line 41 into a second fractionator 42, which is furnished with the usual contacting devices, such as bubble trays, and wherein introduced products are separated into reflux condensate and light vapors in the gasoline boiling range. These vapors pass off through vapor line 43 and condenser 44 into receiving drum 45, this product being a gasoline distillate of the desired end point, which may be blended, if desired, with that produced by the pyrolytic cracking process and collected in drum 12. Reflux condensate which is of a slightly heavier character than that desired for the final distillate, for example, of the nature of kerosene or light gas oil is withdrawn from the bottom of the second fractionator 42, through pipe line 46, and is forced, under pressure generated by pump 47, through return line 48 into pipe 1, for additional pyrolytic cracking. A portion of this condensate is diverted through conduit 49 into the top of the separator 40 to aid in controlling the temperature thereof. Reflux condensate from the bottom of the separator 40 is withdrawn through pipe 50 and is forced, under pressure generated by pump 51, through line 52 into reaction chamber 18, a portion of this oil being diverted through pipe 53 into the top of coke drum 35 as a reflux medium, and another portion being diverted through pipe 54 into the catalyst mixing tank 29, to aid in the formation of the slurry.

In place of a condensate from fractionator 8, condensate or residue from evaporator 5 may be the oil introduced into catalytic reaction chamber 18 for conversion. Heavy residue may be withdrawn from the bottom of the evaporator 5 through pipes 55 and 56, controlled by valve 57, and introduced into the catalytic reaction chamber, either with or without condensate from the fractionator 8. A pipe line 58 connecting with trap out tray 59 is provided whereby an intermediate condensate from the evaporator may be passed to the catalytic reaction chamber either with or without admixture of one of the other stocks mentioned.

The several condensate or residue stocks mentioned hereinbefore are preferably reacted with fixed gases and/or vapors, in the catalytic chamber, but if desired these condensates or residues may be treated independently in the catalytic reaction chamber, without the addition of the gases and/or vapors. Or the gases and/or vapors may themselves be independently treated in the catalytic reaction chamber, the only heavier liquid products present being those necessary to form the slurry of catalytic material.

From the preceding description it will be seen that by an ordinary cracking process gas and relatively heavy liquid products are formed and that these are subjected to treatment in a catalytic reaction chamber, with the resultant conversion thereof into lighter and heavier products. From these products a gasoline distillate of desired end point is formed, as well as a relatively light condensate and a relatively heavy condensate. The former, being relatively free from catalytic material, is combined with the fresh charge, while the heavier condensate is reintroduced into the catalytic reaction chamber for further conversion. Alternatively these two condensates might be withdrawn from the system through pipes 60 and 61 for additional conversion in separate cracking systems. Fresh charge or other cooling medium may be passed through cooling coils 62, 63, and 64, located in evaporator 5, fractionator 8 and fractionator 42, in the usual manner, to control conditions in these pieces of apparatus.

In operation fresh charging stock of any suitable nature for a conventional cracking operation, either in the liquid or vapor phase, is subjected to cracking in the heater 3 and reaction chamber 4. This stock may be, for example, 35° M. C. gas oil, and the outlet temperature and pressure of the cracking heater may be about 850° F. and 750 pounds per square inch. In the evaporator 5, which may be maintained under a pressure in the neighborhood of 200 pounds per square inch, the products are separated into a heavy residue, and an intermediate condensate in the gas oil boiling range, and lighter vapors including fixed gases, vapors in the gasoline boiling range, and cycle stock vapors in the gas oil and kerosene boiling ranges. The heavy residue may be withdrawn from the evaporator and diverted from the system through pipe 9, for any conventional treatment desired, or this residue may be introduced into the catalytic reaction chamber, through pipe 56, for conversion therein at relatively low temperatures. The intermediate condensate of a gas oil character, collected on the trap-out tray 59, may be diverted into the catalytic chamber through pipe 58, either with residue from the bottom of the evaporator or free from it.

In the fractionator 8 the vaporous products may be segregated into three fractions also, a relatively heavy fraction being collected in the bottom of the fractionator in the form of reflux condensate, and an intermediate fraction selected by the trap out tray 25, while light products in the form of vapors falling in the gasoline boiling range, and including incondensable gases as well as vaporous products not normally included in gasoline, are withdrawn from the top of the fractionator through the pipe 10 and introduced in condensed form into the separator 12. In the separator fixed gases and vaporous products too light for inclusion for gasoline, pass off through pipe 13, and are introduced into the catalytic chamber 18, this chamber being maintained at a lower pressure than the separator 12, for example, 100 pounds per square inch. The relatively heavy reflux condensate from the fractionator is preferably returned to the cracking heater, in the usual manner, through line 23, while a relatively lighter refractory condensate, somewhat heavier than gasoline, including kerosene and a lighter gas oil, is diverted from the fractionator through pipe 24 and introduced into reaction chamber 18, either in combination with residue or intermediate condensate from the evaporator 5. This side stream from the fractionator 8 may either be introduced into the reaction chamber directly, or after having been raised in temperature by passage through reheater 20, the temperature in the reaction chamber being preferably in the neighborhood of 600° to 700° F. This temperature is subject to some variation, depending upon the particular character of the stock being treated and upon the degree of cracking desired in the cracking chamber. The particular range that I have mentioned will be found generally satisfactory however. Alternatively the relatively heavy condensate from the bottom of fractionator 8 may be subjected to treatment in the catalytic reaction chamber, either in combination with one or more of the liquid products already mentioned as suitable for such treatment, or by itself. In the catalytic reaction chamber the liquid products, and gases and light vapors from the separator 12, are caused to react with one another in the presence of a catalyst, which is preferably introduced in the form of a slurry through pipe 52, for a sufficient length of time to assure the desired conversion, the converted products being thereafter introduced into the coke drum 35 through pipe 36. This coke drum is held at a lower pressure than the catalytic reaction chamber, this pressure being preferably substantially atmospheric, for example 10 pounds to 20 pounds per square inch.

The catalyst employed may be any one of several metallic halides, for example, aluminum chloride, ferric chloride, zinc chloride or boron tri-fluoride. The preferred catalyst is aluminum chloride, introduced in the form of a fluid slurry which may be easily pumped, the amount introduced being, for example, from 8 to 25 pounds per barrel of stock of oil to be treated. In the coke drum the introduced products are separated into vaporous products, which pass overhead through pipe 39 into separator 40, and coke and carbonaceous matter which settle out in the bottom of the coke drum, this settled material including a certain amount of catalytic material, either in its original form or in combination with hydrocarbons. This carbonaceous material may be removed from time to time, and any free or active catalytic material recovered for further use. The vapors which pass over into the separator 40 also include substantial quantities of the catalytic material. The vapors in the separator are subjected to cooling in the well known manner whereby dephlegmation results, the heavier fractions being condensed in the bottom of the separator, carrying with them substantially all of the catalytic material, and the relatively light vaporous products passing off from the top of the separator, through pipe 41, into the fractionator. The top of the separator is preferably held at such temperature as to insure the separation from the vapors taken overhead, of as much catalyst as possible, without unduly limiting the amount of light vapors selected. This temperature may be, for example, in the neighborhood of 400° F. The material drawn off from the bottom of the separator 5, being relatively heavy condensate, is then preferably recycled through the catalytic reaction chamber for further conversion, pipe 52 being provided for this purpose. A portion of this stock is used for mixing the slurry of catalytic material for introduction into the mixing tank 29, through pipe 54. This condensate may be diverted from the system shown, through pipe 61, and subjected to further individual treatment of a cracking nature; for example, this product may be reduced to coke in any well known form of apparatus. A portion of the condensate from the bottom of the separator is introduced into the top of the coke drum through line 53, in a sufficient quantity to insure cleaning of the baffle plates 38, and also to insure that heavy materials are not entrained of the vaporous material removed from the top of the coke drum. The vapors from the top of the separator are fractionated in the usual well known manner, in fractionator 42, which is operated in such manner as to permit of the removal from the top thereof, of gasoline vapors. The temperature of the top of the fractionator may be controlled by cooling coil 64. The condensate collecting in the bottom of the fractionator, which is of an intermediate nature, falls in a boiling range slightly below that of gasoline, for example a range including kerosene, and light gas oil, is preferably introduced, through line 48, into the charging line 1 as a cycle stock, for further cracking. A portion of this condensate is injected through pipe 49 into the top of separator 40 as a refluxing medium and serves to control the character of the vapors withdrawn from the separator. Alternatively a portion or all of the intermediate condensate from the bottom of fractionator 42 may be diverted from the process through pipe 60, for further individual treatment of a pyrolytic cracking nature.

The process is also adapted for the reformation of gasoline, in which case the charging stock would preferably comprise the heavier ends of gasoline, having an anti-knock value lower than that desired. Where this treatment is carried out the temperature of the cracking heater should be raised to a conventional reforming value, for example 975° F., while the pressure may be reduced to a lower value, such as 200 pounds per square inch. Where this lower pressure is used in the cracking heater the pressure in the succeeding apparatus would be reduced proportionately.

In this description and in the accompanying claims I have designated as pyrolytic the cracking steps wherein no catalyst is used, and as catalytic the conversion steps carried out at relatively low temperature, catalytic action being relied upon for the conversion.

While I have described a particular embodiment of my invention for the purposes of illustration it should be understood that various modifications and adaptations thereof may be made within the spirit of the invention as set forth in the appended claims.

I claim:

1. The process of treating hydrocarbon oil which comprises pyrolytically cracking relatively heavy hydrocarbon oil, separating resulting cracked products into vapors and a liquid residue, passing said vapors to a fractionating zone wherein they are subjected to fractional condensation with the resulting formation of an intermediate condensate and a heavy condensate, removing fractionated vapors from said fractionating zone and condensing them as a desired product, returning heavy condensate formed in the fractionating zone to the initial cracking step in admixture with fresh charging stock, separating mixed gases and vapors lighter than those desired in the final product from the fractionated vapors removed from said fractionating zone, combining these gases and vapors with said intermediate condensate in a catalytic reaction zone in the presence of a metallic halide catalyst, maintaining the gases and vapors and the intermediate condensate in said catalytic zone at a catalytic cracking temperature not in excess of 700° F. under a pressure of not over 200 pounds per square inch for a period of time sufficient to cause substantial conversion thereof, separating the resulting catalytically cracked products into vapors and a liquid residue, passing said vapors last mentioned through a separate fractionating zone wherein they are subjected to fractional condensation, and removing fractionated vapors from said fractionating zone last mentioned and condensing them as a desired product.

2. A process in accordance with claim 1 wherein prior to its introduction into said catalytic cracking chamber said intermediate condensate is subjected to a reheating operation.

3. A process in accordance with claim 1 wherein reflux condensate derived from the fractionating zone wherein the vapors from the catalytic cracking operation are treated is introduced into the initial cracking zone in admixture with fresh charging stock.

4. The process of treating hydrocarbon oil which comprises pyrolytically cracking relatively heavy hydrocarbon oil to produce incondensable gases and cycle stock, maintaining gases and cycle stock so obtained in contact with one another at a catalytic cracking temperature not above 700° F. under a pressure of not more than 200 pounds per square inch and in the presence of a metallic halide catalyst for a period of time sufficient to produce substantial conversion thereof, without substantial hydrogenation, subjecting an intermediate product of such conversion relatively free from said catalyst to a pyrolytic cracking process to form lighter products, and recovering a gasoline distillate therefrom.

5. A conversion process which comprises subjecting hydrocarbon oil to cracking conditions of temperature and pressure, fractionating the resultant vapors to form relatively light and heavy reflux condensates, subjecting heavy reflux to said cracking conditions, finally condensing the fractionated vapors and separating the resulting condensate from incondensable gases too volatile to be included as constituents of motor fuel, combining gases thus obtained with said light reflux oil, maintaining the resultant mixture in an independent conversion zone at catalytic conversion temperature not above about 700° F. under a pressure of not more than about 200 pounds per square inch and in the presence of a metallic halide catalyst for a period of time sufficient to produce substantial conversion thereof, without substantial hydrogenation, combining products obtained from the independent conversion operation with said first-mentioned oil, and recovering the final condensate as a product of the process.

HAROLD V. ATWELL.